(No Model.)

C. A. ANDERSON.
ROCK AND EARTH TRUCK.

No. 361,477. Patented Apr. 19, 1887.

Witnesses
John S. Finch Jr.
C. A. Davis

Inventor
Chas. A. Anderson
By his Attorney
C. M. Alexander

United States Patent Office.

CHARLES A. ANDERSON, OF BOULDER, COLORADO.

ROCK AND EARTH TRUCK.

SPECIFICATION forming part of Letters Patent No. 361,477, dated April 19, 1887.

Application filed January 24, 1887. Serial No. 225,372. (No model.)

*To all whom it may concern:*

Be it known that I, CHARLES A. ANDERSON, a citizen of the United States, residing at Boulder, in the county of Boulder and State of Colorado, have invented certain new and useful Improvements in Rock and Earth Trucks, of which the following is a specification, reference being had therein to the accompanying drawings.

My invention relates to certain new and useful improvements in trucks; and it is particularly designed for use in handling earth and rocks in railroad grading and other similar operations.

The invention has for its objects to provide a simple and durable apparatus that will, by its peculiar construction, enable heavy loads to be transported from place to place and dumped with comparative ease, and which will be provided with simple and effective means for loading large rocks or bowlders; and it consists in certain novel features of construction, which will be fully hereinafter pointed out and claimed.

The above objects I attain by the means illustrated in the accompanying drawings, in which—

Figure 1:
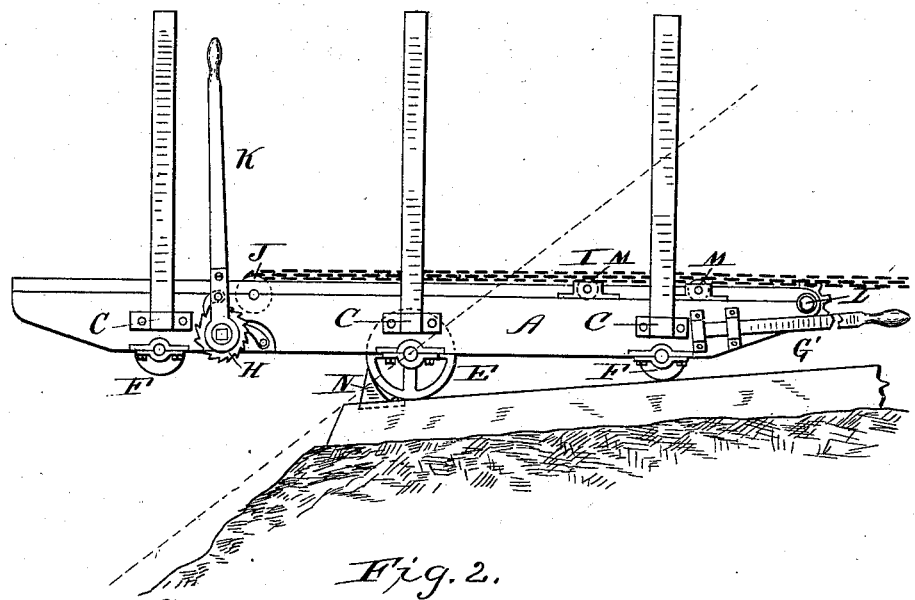
Figure 2:
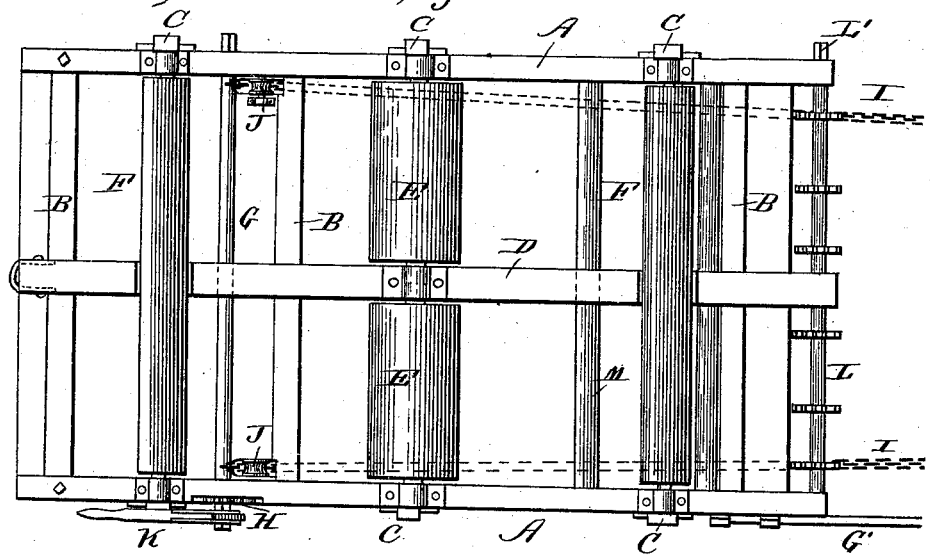

Figure 1 represents a side elevation of my improved truck, and Fig. 2 a bottom view of the same.

Referring to the drawings by letters, A designates the side beams of the frame, connected together by the transverse beams B and the floor-boards of the truck, and provided with a suitable number of straps or loops, C, for standards and side-boards, should it be desired to use the same.

Extending across the middle of the truck-frame, and arranged to turn independently of each other in bearings in the side beams, A, and center beam, B, are two coaxial supporting or main rollers, E, which serve to support the entire load of the truck, and enable the same to be steered with ease. Near each end of the truck-frame, and journaled in bearings in the side beams thereof, are the end rollers, F, which are somewhat smaller in diameter than the center rollers, and assist them to support the load while the truck is at rest, or while operating on an inclined track. Secured upon the rear end of the truck, and projecting rearwardly therefrom, is the operating or steering handle G', by means of which the truck may be easily steered as it moves along on the track or bed.

Extending across the frame of truck near the front roller, and journaled in the longitudinal beams of the said frame, is a shaft or drum, G, which at one end has a ratchet-wheel, H, secured to it, the said ratchet-wheel being engaged by a suitable pawl pivoted to the side beam of the frame. This shaft or drum, between the side beams of the frame, has attached to it two chains, I, which pass up through openings in the floor of the truck over pulleys J and back to the rear of the truck, where they are secured to the rock or other heavy object to be drawn upon the truck.

To operate the shaft or drum G and wind the chains thereon is a ratchet-lever, K, which is fitted on the squared projecting end of the shaft, and may be of any suitable construction. Journaled in the rear ends of the longitudinal beams of the truck is another transverse shaft, L, which is provided with a series of sprocket-wheels along its length.

In operation the links of the chains I engage with the teeth on the sprocket-wheels, and are thereby guided as they pass to the winding-drum.

The sprocket-wheel shaft is provided with a squared extension, L', in order that a ratchet-lever similar to the one on the chain-drum may be applied to it, and thereby materially aid in the loading of very heavy bowlders or rocks should the same be too large for the chain-drum alone to operate upon.

Extending across the truck-frame near its rear end, and projecting above its floor slightly, are two rollers, M, which serve to support and facilitate the passage of the chains as they are wound upon the drum. These rollers also aid in placing large rock upon the center of the truck, so that the same will be well balanced.

The track used in connection with this truck consists simply of pieces of timber laid upon the ground at the place of dumping, there being secured blocks N, which serve to arrest the movement of the truck by striking against the center or large rollers.

The sudden arresting of the movement of the truck will usually be sufficient to dump the same, throwing the truck into the position shown by the dotted line in Fig. 1 of the drawings.

Having thus fully described my invention, what I claim, and desire to secure by Letters Patent, is—

In a rock and earth truck, the combination of the frame, the center rollers, E E, and the end rollers, F F, of the chain-drum G, journaled in the forward end of the frame and the ratchet mechanism therefor, the rollers J, the shaft L, journaled at the rear end of the truck-frame, the sprocket-wheels secured upon the said shaft L, and the loading-chains I, secured to the chain-drum and passing to rear of the truck, and engaging the sprocket-wheels upon the shaft L, substantially as described.

In testimony whereof I affix my signature in presence of two witnesses.

CHARLES A. ANDERSON.

Witnesses:
A. PETERSON,
LOUIS LARSON.